United States Patent
Eyles

[15] 3,690,098
[45] Sept. 12, 1972

[54] CONTROL ARRANGEMENT FOR HYDRAULIC TRANSMISSION SYSTEM

[72] Inventor: Leonard William Eyles, Ormskirk, Lancs, England

[73] Assignee: Joseph Lucas (Industries) limited, Birmingham, England

[22] Filed: Dec. 31, 1970

[21] Appl. No.: 103,122

[52] U.S. Cl. .................................. 60/53 R, 60/53 A
[51] Int. Cl. ............................................. F15b 15/18
[58] Field of Search ..................... 60/53 R, 53 A, 19

[56] References Cited

UNITED STATES PATENTS

| | | | |
|---|---|---|---|
| 3,139,723 | 7/1964 | Hollowell | 60/53 R X |
| 3,243,959 | 4/1966 | Fantom | 60/53 A |
| 3,393,509 | 7/1968 | Kempson | 60/53 R |

Primary Examiner—Edgar W. Geoghegan
Attorney—Holman & Stern

[57] ABSTRACT

A control arrangement for a hydraulic transmission system has a relief valve which operates to interconnect the pressure and return lines of the system. The relief valve is operable by a pilot valve controlled by the pressure in the return line. Rise in return line pressure due, for example, to an external torque applied to the output shaft of the transmission system, causes the pilot valve to operate the relief valve.

6 Claims, 2 Drawing Figures

CONTROL ARRANGEMENT FOR HYDRAULIC TRANSMISSION SYSTEM

This invention relates to a control arrangement for a hydraulic transmission system of the kind which includes a pump, a motor, a pair of passages interconnecting the pump and motor, a relief valve between the two passages and a pilot valve which operates the relief valve to interconnect the passages when the pressure in either passage exceeds a prescribed value.

In hydraulic transmissions of the foregoing kind an external torque applied to the output shaft in its driven direction of rotation will cause the motor to act as a pump and consequent damage to the transmission and prime mover may result.

According to the invention a control arrangement for a hydraulic transmission system of the kind specified includes an auxiliary piston for operating the pilot valve and a selector valve for connecting the piston to the passage, which is acting as a return line, the arrangement being such that a rise in the pressure in the return line above a predetermined level will cause the auxiliary piston to operate the pilot valve and thereby cause the relief valve to interconnect the passages.

Embodiments of the invention will now be described by way of example and with reference to the accompanying drawings each of which shows diagrammatically a part of a hydraulic transmission system and an associated control arrangement.

Figure 1:
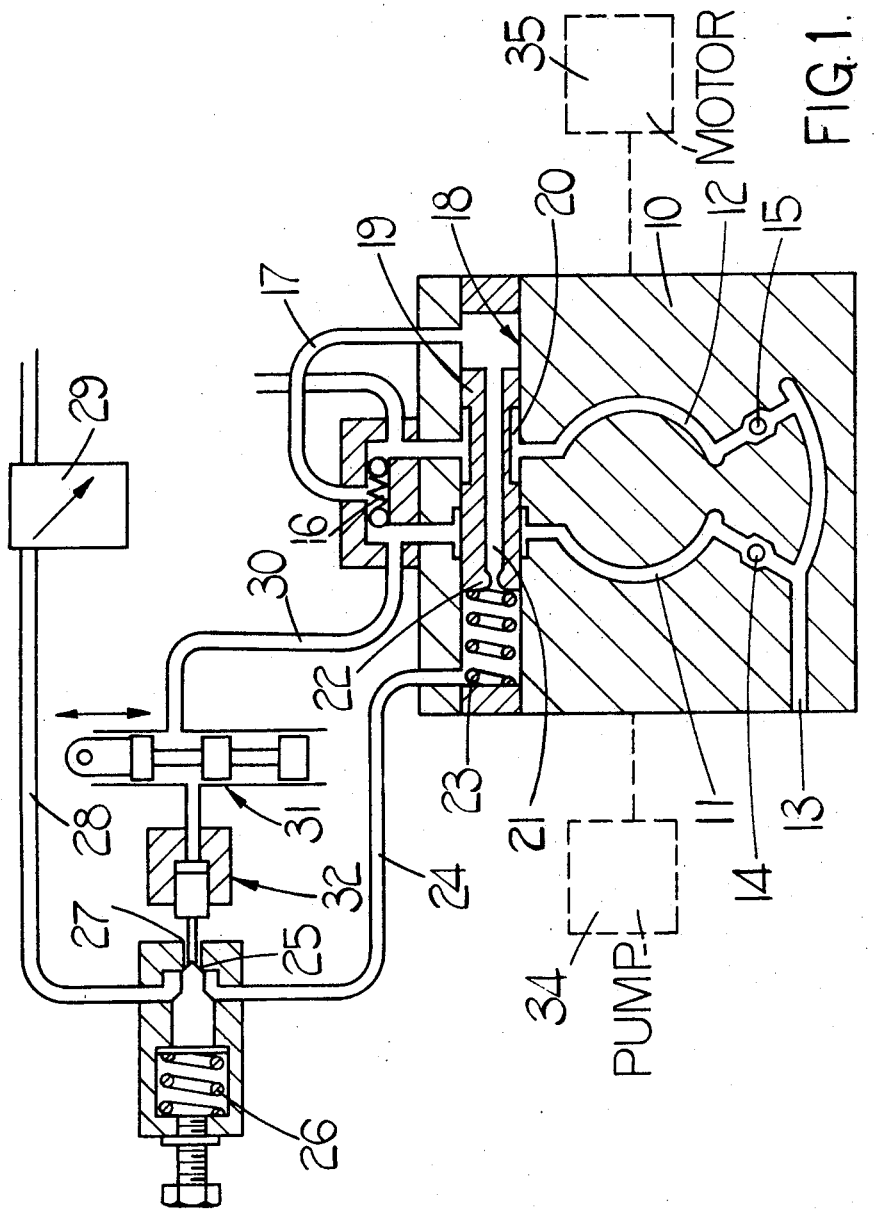

The hydraulic transmission system shown in FIG. 1 has an axial piston pump 34 and an axial piston motor 35 in a back-to-back configuration. Between the pump and motor is a block 10 having a pair of ports 11, 12 interconnecting the pump and motor, port 12 being at the higher pressure when the motor has a direction of rotation corresponding to forward movement. Ports 11, 12 are connected via a passage 13 to a fluid supply from a boost pump (not shown). A pair of non-return valves 14, 15 serve to isolate whichever of the ports 11, 12 is at the higher pressure from the other port and from the passage 13. Ports 11, 12 are also connected via a shuttle valve 16 to a passage 17 which opens into one end of a bore 18 in the block 10. A spool valve 19 is slidable in the bore 18 and includes a recess 20 by means of which ports 11, 12 may be interconnected. The spool valve 19 has an axial bore 21 formed at one end with a flow restrictor 22. The valve 19 is urged in a direction to isolate the ports 11, 12 from each other by a spring 23. The end of the bore 18 remote from the passage 17 communicates via a passage 24 with a pilot valve 25 which is loaded by a spring 26 and has a vent 27. The passage 24 also communicates with a passage 28 which includes a normally closed by-pass valve 29. The port 11 is connected, via a passage 30 and a spool valve 31 with an auxiliary piston and cylinder unit 32. The valve 31 is positioned by a direction control means (not shown) for the motor, so that port 11 communicates with the unit 32 only when the motor has a forward direction of rotation. The piston of the unit 32 coacts with the pilot valve 25 so that fluid pressure admitted from passage 30 urges the piston in a direction to open the pilot valve 25.

In use, with the motor rotating forward and port 12 at the higher pressure the shuttle valve 16 operates to allow the said higher pressure to pass via the passage 17, bores 18, 21 and passage 24 to the pilot valve 25. If the pressure in port 12 rises above a predetermined level the vent 27 of the pilot valve 25 opens. The resultant flow through the restrictor 22 causes a pressure drop urging the valve 19 against the spring 23 to permit ports 11, 12 to intercommunicate.

If an external torque is applied to drive the motor in a forward direction the motor will act as a pump and the pressure in port 11 will be greater than that in port 12. The shuttle valve 16 will operate to apply the pressure in port 11 to the pilot valve 25. Rising pressure in port 11 will cause the piston and cylinder unit 32 to open the pilot valve 25, and the spool valve 19 moves to interconnect ports 11, 12. The dimensions of the restrictor 22, spring 23 and the piston in the unit 32 are such that in these conditions a pressure difference will nevertheless continue to be maintained between ports 11, 12.

An external prime mover coupled to the pump will thus continue to act as a brake on the external torque applied to the motor, though the resulting power conveyed by the transmission system will not become large enough to cause damage to the transmission itself or to the prime mover.

Figure 2:
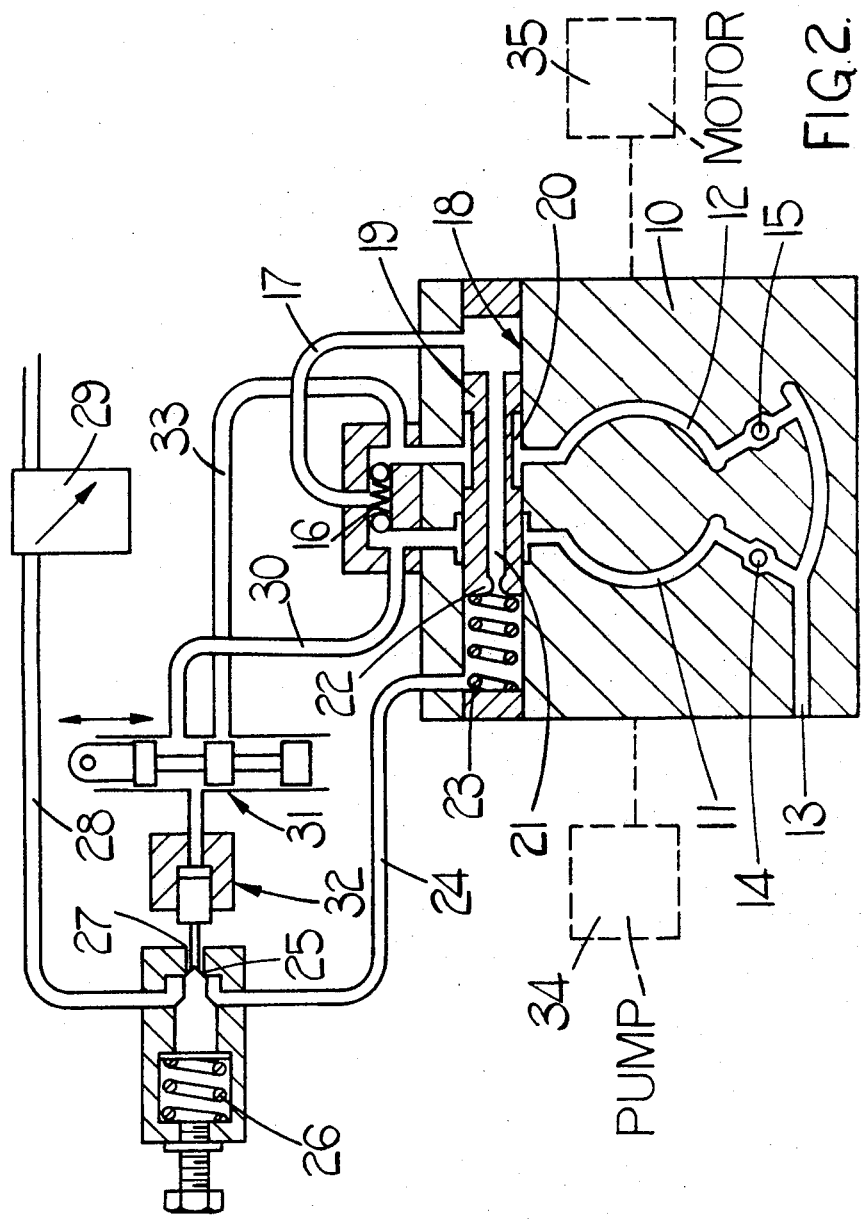

The alternative arrangement shown in FIG. 2 is generally similar to that previously described with reference to FIG. 1, but includes a passage 33 by means of which the part 12 is connected to the spool valve 31. The spool valve 31 is arranged to connect passages 30, 33 to the piston and cylinder unit 32 when the direction control means for the motor is respectively in positions corresponding to forward and reverse. The arrangement thus serves to protect the prime mover in both directions of rotation of the motor.

Having thus described my invention what I claim as new and desire to secure by Letters patent is:

1. A control arrangement for a hydraulic transmission system including a pump, a motor, a pair of passages interconnecting the pump and motor, a relief valve between the two passages and a pilot valve which operates the relief valve to interconnect the passages when the pressure in either passage exceeds a prescribed valve, said control arrangement comprising an auxiliary piston unit for operating the pilot valve and a selector valve for connecting the piston unit to the passage which is acting as a return line, the arrangement being such that a rise in pressure in the return line above a predetermined level will cause the auxiliary piston unit to operate the pilot valve and thereby cause the relief valve to interconnect the passages.

2. A control arrangement as claimed in claim 1 in which the relief valve comprises a spool valve and there is provided a fluid flow restrictor interconnecting the ends of the spool valve and a shuttle valve by means of which the upstream end of the spool valve communicates with the passage at the higher pressure, an increase in flow through said restrictor providing a servo pressure urging the spool valve to interconnect said passages.

3. A control arrangement as claimed in claim 2 in which the pilot valve is a relief valve in series with the restrictor.

4. A control arrangement as claimed in claim 2 in which the pilot valve is connected between the downstream side of the restrictor and a low pressure connection.

5. A control arrangement as claimed in claim 4 which includes a bypass valve connected in parallel with the pilot valve.

6. A control arrangement as claimed in claim 1, in which the selector valve is operable to connect the piston unit to whichever of the passages is acting as the return line.

* * * * *